United States Patent Office 2,791,721
Patented May 7, 1957

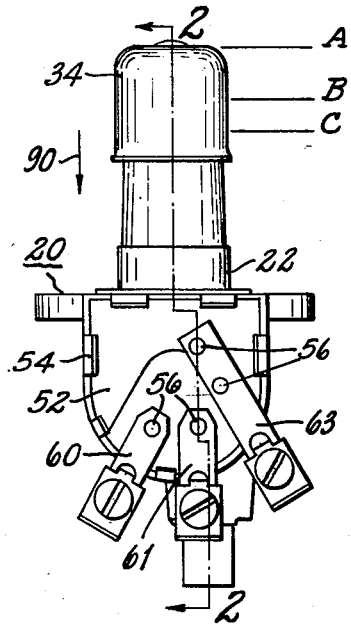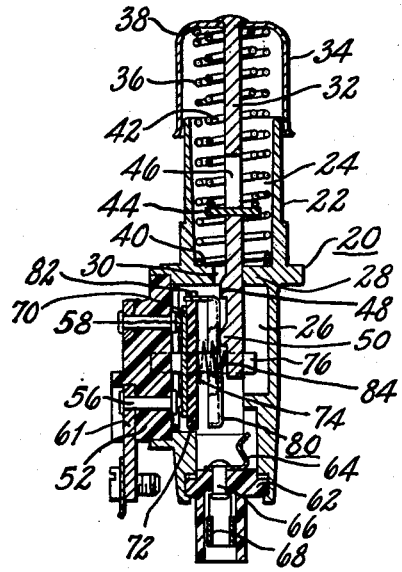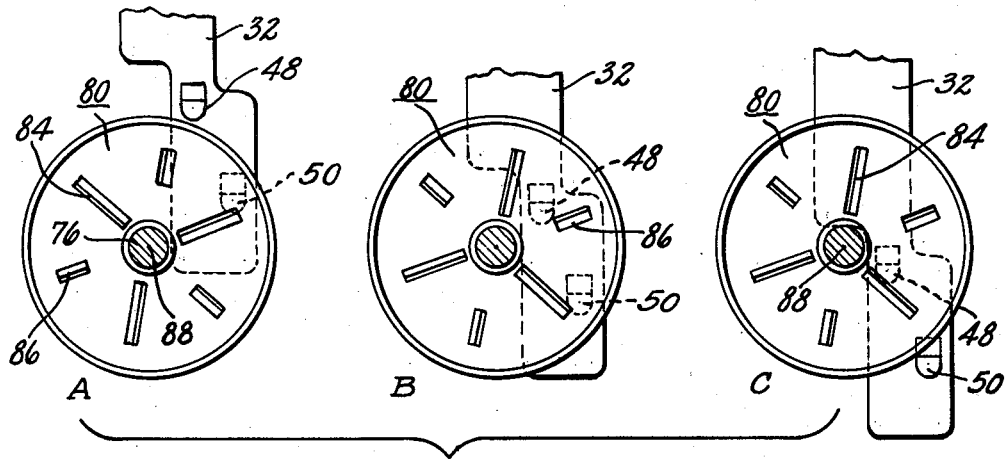

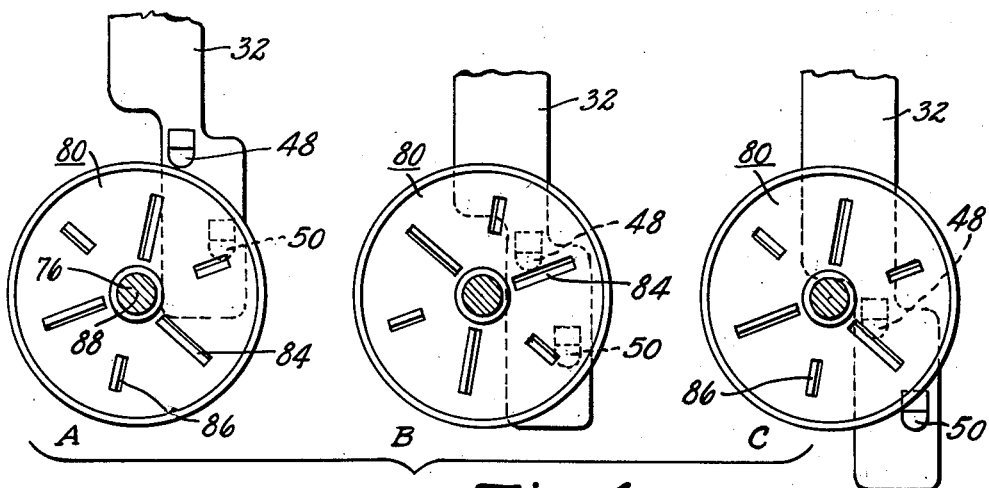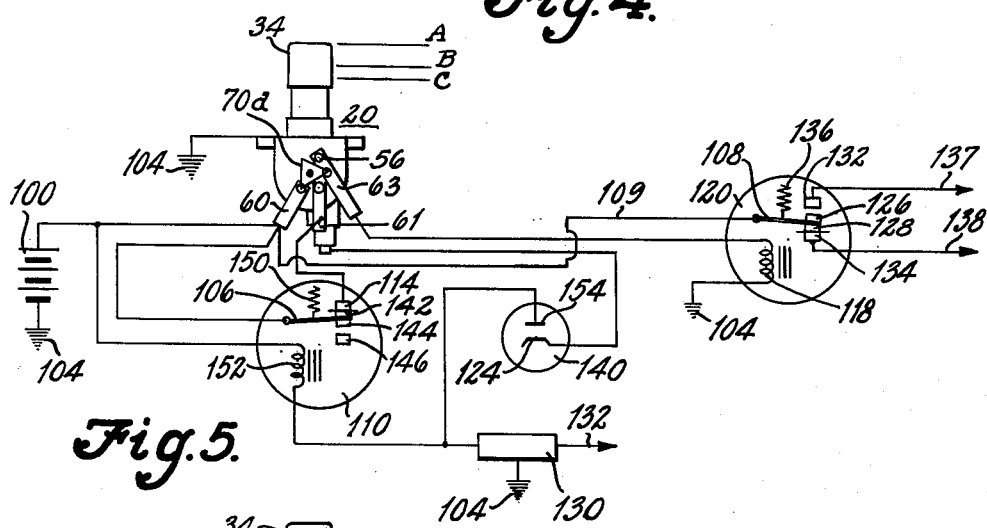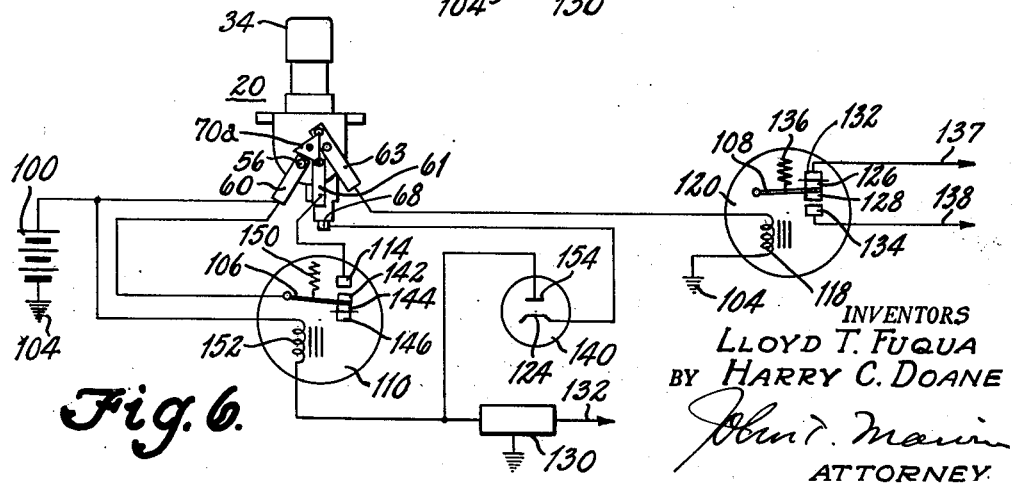

2,791,721

HEADLIGHT CONTROL

Lloyd T. Fuqua, Fortville, Ind., and Harry C. Doane, Lake Fenton, Mich., assignors to General Motors Corporation, Detroit, Mich., a corporation of Delaware Application May 19, 1954, Serial No. 430,939

10 Claims. (Cl. 315—82)

This invention relates to headlight controls and more particularly concerns a switch and system for automatically dimming the headlights of a vehicle when another vehicle approaches and for manually controlling the automatic dimming means for signalling and other purposes.

It is an object of the present invention to include a foot dimmer switch in headlight circuits for a vehicle for selectively connecting the headlamps of a vehicle in a circuit so a preselected illuminating effect is realized or in another circuit that includes an automatic device that will circuit the lamps for providing either said first or another effect depending upon certain conditions and where in the switch will modify the above circuits, when desired, for temporarily circuiting the lamps so that said other effect is realized for signalling and other purposes.

It is a further object of the present invention to provide a foot dimmer switch for controlling circuits which will selectively place the headlamps of the vehicle in either a low beam circuit or under the control of the device which will circuit the lamps in either a high or low position depending upon certain conditions, said switch being adapted to modify the control of said device on said circuits so that the lamps will be in a high beam position for signalling or other purposes.

The automatic control of the headlamps of the present day vehicle has done much to increase the comfort and safety of operation of vehicles. These automatic devices; which are included in the headlamp circuits, generally are responsive to external conditions as light from an external source, and accordingly automatically vary the illuminating effect of the headlamps of the vehicle in response to the emission of light from an oncoming vehicle. To further increase the effective operation of the headlamps of the vehicle in connection with the use of the automatic device, it has been found desirable to provide a switch whereby the driver of the vehicle may either indefinitely place the headlamps on a low beam position or in control of the automatic device which responds to the light from the headlamps of an approaching vehicle, and changes the lights from a highbeam to a low beam position or dims the headlights to permit the oncoming vehicle to pass in greater safety. Frequently the drivers of oncoming vehicles do not dim their lights unless the request is made by signalling for them to do so. To accomplish this signalling, the switch and circuit, therefore of the present invention replaces the two switches heretofore used so as to add considerably to the comfort and safety and simplify the operation of the motor vehicles.

Further objects and advantages of the present invention will be apparent from the following description, reference being had to the accompanying drawings wherein a preferred embodiment of the present invention is clearly shown.

In the drawing:

Figure 1 in elevation shows a foot dimmer switch according to the present invention.

Figure 2 is a sectional view along line 2—2 in Figure 1.

Figure 3 shows in sequence the various positions of a driving disc during one cycle operation of the switch.

Figure 4 shows the various positions of a driving disc during another cycle operation of the switch.

Figure 5 diagrammatically shows the electrical components of a system wherein the headlamps are in a low beam position.

Figure 6 shows the electrical component parts as in Figure 5 with the headlamp in the high beam position.

The foot dimmer switch 20, shown in Figures 1 and 2, generally comprises a suitable housing 22 that is divided into an upper chamber 24 and a lower chamber 26 by a wall 28 that has an opening 30 through which a plunger 32 extends. The plunger 32 is provided with a cap 34 that telescopes over the wall portions surrounding the chamber 24 when the cap 34 and plunger 32 are depressed against the compression of a spring 36 that has one end 38 seated against a wall of the cap and the other end 40 seated on the shoulders which surround opening 30. A second spring 42 coiled about plunger 32 and located concentrically within the convolutions of spring 36 has one end seated against cap 34 and the other end seated against a spring seat 44 that is received in a suitably slotted opening 46 located in plunger 32. Spring seat 44 and slot 46 are located to oppose further movement of plunger 32 after it has been depressed against the action of spring 36 from the position shown as A to B in Figure 1. During the movement from position B to C, the spring seat 44 engages wall 28 and increases the resistance against further depression. Plunger 32 also has projections 48 and 50 located as shown in Figures 3 and 4 for the purpose that will become hereinafter apparent.

The lower portion of switch housing 22 which contains the chamber 26 has one wall closed by terminal block member 52 which is preferably made of insulating material and secured to housing 22 by the staked metallic ear portions 54. The terminal block 52 has a plurality of stationary contacts 56 embedded therein which are arranged in a circular row and have rounded head portions 58 on one end exposed to the interior of chamber 26. The other ends of contacts 56 have terminals 60, 61 and 63 secured thereto as shown which are connected in the electric circuits as shown in Figures 5 and 6. A second member 62 of insulating material used to close another opening in chamber 26 has a bent contact 64 secured therein by a rivet 66 which acts as a conductor through the insulating material 62 to a terminal 68 which in the particular embodiment shown is of the standard telescopic Douglas type.

The switch 20 also includes a rotatable contact 70, an insulating driving member 72 a coil spring 74, a shaft 76, as well as terminal block 52. These may be of the type and function as is clearly set forth in the patent to W. E. Brown 2,496,118, as filed May 21, 1937, and assigned to the assignee of the present invention.

Driving disc 80, shown clearly in Figures 3 and 4, is rotatably mounted on the shaft 76, and has a lug 82 which is received in a notch in the periphery of insulated member 72 so as to rotate member 72 when disc 80 is rotated. The driving disc 80 is formed to have a plurality of elements 84 which may be either of the ratchet type projections as shown in Figure 2 or may be ratchet type depressions as shown in the patent to Brown. These ratchet elements 84 are radially spaced in a circular row on disc 80 and comprise longer teeth 84 and shorter teeth 86 alternately spaced on disc 80 and located so that the portions of the teeth 84 and 86 remote from the center 88 of disc 80 are equidistant from the center 88. Plunger 32 is formed as shown in Figures 3 and 4 so that it will pass shaft 76 when the plunger is depressed in the direction of arrow 90 in Figure 1 and will move the disc 80 in one direction of rotation only because of the ratchet configuration of the teeth 84 and 86.

It is readily apparent that when the plunger 32 is depressed in the direction of arrow 90 a distance as represented from A to B in Figure 1, the lug 50 which is located to engage both the longer 84 and the shorter 86 ratchet elements will rotate disc 80 one step or one sixth of a revolution from the position shown in Figure A to that shown in Figure B, in Figures 3 and 4 and thus move the disc 80 and rotatable contact 70 through insulating member 72, one sixth of a revolution or one cycle and because these parts are arranged in a predetermined relation relative to the stationary contacts 56, the switch will be moved from the automatic to the manual, lower beam position, or vice versa. In this connection it is to be noted that this particular function of the switch 20 when depressed from A to B is the same as occurs when the switch in the Brown patent is fully depressed except that because of the circuits wherein the switch is included, the automatic position of the present invention replaces the manual upper beam position.

When the switch is in the manual position, as shown in Figure 3, a depression of the plunger 32 from A to B in Figure 1 moves disc 80 one cycle into the automatic position B of Figure 3, and when the plunger 32 is fully depressed from B to C, the plunger 32 will engage contact 64, the purpose of which will become hereinafter apparent, and complete a circuit between the plunger 32 and the contact 64 without continuing the movement of disc 80. To accomplish this result the parts of the switch 20 are so arranged that upon depression of the plunger from A to B as in Figure 1, the projection or lug 50 will engage the longer ratchet elements 84 and move the disc 80 from the position A to the position B shown in Figure 3. When plunger 32 is depressed from position B to C in Figure 1, lugs 48, because of their location on plunger 32, will pass closer to center 88 of disc 80 than lugs 50 without contacting the lugs 86 so that the disc is not rotated, so the contact 70 of switch 20 will be rotated one sixth of a revolution relative to contacts 56 in spite of the fact that the plunger has been fully depressed.

When the rotor disc is in the automatic position A as shown in Figure 4, and the plunger is depressed from A to B in Figure 1, lug 50 will first engage one of the shorter lugs 84 and move the disc one-sixth of a revolution from the automatic position A to the manual position B in Figure 4. When plunger 32 is depressed from the position shown in B to C in Figure 1, lug 48 will engage in inner radial portions of the longer ratchet elements 84 and continue the movement of disc 80 an additional one sixth revolution so as to return the disc 80 to the automatic position designated as C in Figure 4. Thus it is apparent that each full depression of the plunger 32 will move the parts of a switch to the automatic position while a partial depression of the plunger will merely rotate the parts between the automatic and manual position and vice versa and further when the plunger 32 is completely depressed, it will contact the stationary contact 64, that is spaced from the rotary disc member and other stationary contacts 56, for the purpose that will become hereinafter apparent. It is apparent that after the plunger 32 is depressed it will be returned to its original position without moving disc 80 because of the ratchet shape of openings 84 and 86.

In Figures 5 and 6 the switch 20 is diagrammatically shown as included in a circuit that includes a storage battery 100, a sensitive relay 110, a power relay 120, an override tube 140 and a current controlling means 130 that is responsive to external conditions indicated as arrow 132. The movable contact of switch 20 is designated as 70a. The terminal 60 of the switch is connected in the circuit as follows; to battery 100 which is grounded at 104, to movable armature 106 of sensitive relay 110 and to armature 108 of core relay 120. A second switch terminal 61 is connected with a stationary contact 114 of sensitive relay 110. A third switch terminal 63 which is associated with two stationary contacts 56 of switch 20 is connected to a coil 118 of power relay 120 which in turn is connected to ground 104. The switch terminal 68, which is electrically connected through rivet 66 and contact 64 in Figure 2, is adapted to be connected through the housing 22 of switch 20 to ground 104 when the plunger 32 is fully depressed and engages contact 64, is electrically connected to the cathode 124 of the override tube 140.

The armature 108 of power relay 120, which is electrically connected to battery 100 through lead 109, carries a pair of movable contacts 126 and 128 that are adapted to alternately make and break a circuit with stationary contacts 132 and 134. The armature 108 is normally biased by a spring 136 so that a circuit between movable contact 126 and stationary contact 132 is made when no current is flowing through the coil 118 of the power relay. When current flows through coil 118, armature 108 is attracted against the force of spring 136 and moved so that contact between movable contact 128 and stationary contact 134 is made. The stationary contact 132 is connected so the upper beam circuits 137 of the headlight, not shown, will be energized from battery 100 through armature 108 when contacts 132 and 126 are closed and the stationary contact 134 is connected so the lower beam circuit 138 of the headlights, not shown, will be energized from battery 100 through armature 108 when contacts 134 and 128 are closed.

The movable armature 106 of sensitive relay 110 carries a set of movable contacts 142 and 144 which are adapted to make or break contact with stationary contacts 114 and 146 respectively when the armature 106 is moved against the force of spring 150 by the attraction exerted by coil 152 when current flows therethrough. The armature 106 is so biased by spring 150 that the movable contact 142 normally engages stationary contact 114 when no current is flowing through the coil 152.

The coil 152 of sensitized relay 110 has one end suitably connected to battery 100 and the other end connected with a current controlling means 130 which varies the intensity of the current passing through coil 152 to ground 104 in response to an external control 132 which may be a photoelectric control tube, not shown.

The end of coil 152 which is associated with the current control means 130 is also connected with the plate 154 of the override tube 140 so that when the cathode 124 of the override tube 140 is grounded through switch 20, current flows through the coil 152 of the relay 110. Current control means 130 is designed so that no current will pass through coil 152 when there is light on the photo tube control 132 and conversely when no light is present on photo tube control 132, current control means 130 will permit current to flow through coil 152 of sensitive relay 110 and thereby attract armature 106 to open the circuit between contacts 114 and 142.

With the foregoing in mind the operation of the system in Figures 5 and 6 will be described.

In Figure 5 the contact 70A is shown as rotated to make a circuit between terminal 60 and terminal 63 to connect the battery 100 directly with the coil 118 of power relay 120 and thereby actuate coil 118 and attract armature 108 against the force of spring 136 and cause contact 128 to engage contact 134 and place the headlamps of the vehicle on the lower beam position 138.

When the movable contact as 70A is moved to the position shown in Figure 6 wherein terminals 61 and 63 are connected, the system will be placed under the control of the automatic means which includes; the external control 132, the current controlling device 130, the sensitive relay 110, and the power relay 120. The coil 118 of the power relay 120 is in circuit with the stationary contact 114 of the sensitive relay 110. In Figure 6 the movable contact 144 is shown as contacting the stationary contact 146. This situation occurs when no light is present on the photoelectric control tube 132 so as to cause the coil 152 of relay 110 to be energized and attract armature 106. When contacts 144 and 146 close, the circuit between battery 100 through contacts 114 and 142 to the coil 118 of power relay 120 is broken and contacts 126 and 132 will engage each other and thereby place the headlights on the upper beam position 137. When light is present on the photoelectric control tube 132, so that the current control means 130 limits the amount of current passing through relay 152 to permit spring 150 to move armature 106 and movable contact 142 into engagement with stationary contact 114, a circuit between the battery 100 and the coil 118 of power relay 120 through terminals 61 and 63 is formed to cause the coil 118 to be energized and attract the movable armature 108 and close the circuit between contacts 128 and 134 and place the headlamps in a low beam position 138.

From the above arrangement of parts it is manifest that when current is passing therethrough the coil 152 of sensitive relay 110, the headlamps will be placed on the upper beam position 137. This result may be also accomplished when the plunger 32 of switch 20 is depressed from A to C in Figure 1 to cause the plunger 32 to engage stationary contact 64 and thereby cause the cathode 124 of override tube 140 to be connected to ground 104. This will result in a flow of current in the coil 152 and cause the armature 106 to be attracted and break the connection between the contacts 142 and 114 deenergize coil 118 and temporarily place the headlamps in the upper beam position for signalling and other purposes as long as plunger 32 is depressed sufficiently to engage contact 64.

From the above it is manifest that the switch 20 as shown may be used in a variety of circuits. The present invention being directed particularly to the switch and its inclusion in a circuit whereby a manual, an automatic, or an override control circuit to the headlamps of a vehicle is accomplished by a single switch rather than a plurality of switches as heretofore used.

While the embodiment of the present invention as herein described constitutes a preferred form it is to be understood that other forms might be adopted.

What is claimed is as follows:

1. In an electric switch having a plurality of stationary contacts arranged in a circular row and a rotatable contact adapted to selectively engage certain of said spaced contacts, a means for actuating said rotatable contact including; a rotatable disc operatively connected with said rotatable contact and having a plurality of two spaced ratchet elements two different lengths alternately arranged in a circular row, and a reciprocatory plunger provided with a plurality of staggered projections, one of said projections being adapted to engage all of said ratchet elements and another projection adapted to engage only alternate elements.

2. In an electric switch having a plurality of stationary contacts arranged in a circular row, a rotatable contact adapted to selectively engage certain of said stationary contacts, and means for actuating said rotatable contact, said means including; a rotatable disc operatively connected with said rotatable contact having a plurality of staggered radially spaced ratchet openings arranged in a circular row on said disc, and a reciprocating plunger provided with two staggered spaced projections, one of said projections being adapted to engage all of said ratchet openings for rotatively moving said disc a predetermined portion of a revolution when said plunger is axially moved a predetermined distance relative to said disc and other of said lugs being adapted to engage only alternate ratchet openings and thereby move said disc an additional portion of a revolution when said plunger is moved beyond said first position to a second predetermined position, and a stationary contact in spaced relation to said disc and said other contacts adapted to be engaged by a portion of said plunger when said plunger is moved beyond said second position to a third position relative to said disc.

3. In an electric switch having a plurality of stationary contacts arranged in a circular row and a rotatable contact adapted to selectively engage certain of said spaced contacts, means for actuating said rotatable contact, comprising; a rotatable disc operatively connected with said rotatable contact and having a plurality of staggered ratchet openings alternately arranged and radially spaced in a circular row on said disc and a reciprocal plunger having two spaced staggered projections thereon, one of said projections being adapted to engage all of said ratchet openings for rotatively moving said disc one-sixth of a revolution when said plunger is axially moved a predetermined position relative to said disc and the other of said lugs being adapted to engage only alternate ratchet openings and thereby alternately moving said disc an additional one-sixth revolution when said plunger is moved beyond said first position to a second predetermined position relative to said disc.

4. In a lighting system for a vehicle having illuminating means and a source of current, the combination comprising; a relay having a movable armature operable to selectively complete a plurality of different circuits between said current source and said illuminating means for varying the illuminating effect thereof, an automatic means adapted to be placed in circuit with said current source and a coil of said relay for controlling the energization of said coil whereby said armature is selectively operated to a plurality of different positions for completing one of said plurality of circuits in each position thereof, and an independent switch having at least three different circuit closing positions in circuit with said relay and automatic means, said switch being circuited and adapted in one position to nullify the effect of said automatic means on said coil, said switch being adapted when in another of said positions to place said automatic means in circuit with said relay coil for controlling the operation thereof and said switch when in the third circuit closing position being adapted to nullify the effect of said automatic means on said relay.

5. In an electric switch having a plurality of stationary contacts arranged in a circular row, a rotatable contact adapted to selectively engage certain of said stationary contacts, and means for actuating said rotatable contact, said means including; a rotatable disc operatively connected with said rotatable contact having a plurality of two spaced ratchet openings of different radial lengths alternately and radially arranged and radially staggered and circumferentially spaced in a circular row on said disc, a reciprocating plunger adapted to axially move relative to said disc, and at least two projections staggerdly spaced on said plunger, one of said projections being adapted to engage all of said ratchet openings for rotatively moving said disc a predetermined distance when said plunger is moved a predetermined distance, and the other of said projections being adapted to engage only alternate openings when said plunger is moved beyond said predetermined distance for rotatively moving said disc an additional distance.

6. In an electric switch having; a plurality of stationary contacts arranged in a circular row, a rotatable contact adapted to selectively engage certain of said stationary contacts, and means for actuating said rotatable contact, said means including; a rotatable disc operatively connected with said rotatable contact and having a plurality of spaced ratchet openings of two different lengths alternately and radially arranged and radially staggered and circumferentially spaced in a circular row on said disc, a plunger adapted to axially move relative to said disc, at least two spaced projections disposed in staggered relation on said plunger, one of said projections being adapted to engage all of said ratchet openings for rotatably moving said disc a predetermined distance when said plunger is moved a predetermined distance, and the other of said projections being adapted to engage only alternate openings when said plunger is moved beyond said predetermined distance for rotatably moving said disc an additional distance, and a stationary contact in spaced relation to said disc and said other contacts adapted to be engaged by portions of said plunger when said plunger is moved beyond said second distance to a third position relative to said disc.

7. In a lighting system for a vehicle having an illuminating means and a source of current, the combination comprising; a relay having a movable armature operable to selectively complete a plurality of different circuits between a current source and said illuminating means for varying the illuminating effect thereof, an automatic means adapted to be placed in circuit with said current source and coil of said relay for controlling the energization of said coil whereby said armature is selectively operated to a plurality of different positions for completing one of said plurality of circuits in each position thereof, and an independent switch in circuit with said plurality of circuits having at least three different circuit closing positions, said switch including; a plurality of stationary contacts arranged in a circular row, a rotatable contact adapted to selectively engage certain of said stationary contacts, means for actuating said rotatable contact, said means including, a rotatable disc operatively connected with said rotatable contact and having a plurality of spaced staggered ratchet openings of two different lengths alternately arranged and radially located in a circular row on said disc, and a reciprocating plunger having two spaced staggered projections, one of said projections being adapted to engage all of said ratchet openings for rotatably moving said disc one-sixth of a revolution when said plunger is axially moved to said first position relative to said disc for moving said contact to one circuit closing position for nullifying the effect of said automatic means on said coil, the other of said lugs being adapted to engage only alternate openings and thereby alternately move said disc and contact an additional sixth revolution when said plunger is moved beyond said first position to a second position relative to a circuit between said disc whereby said automatic means and said relay is closed whereby said automatic means controls the operation of said relay, and a stationary contact in spaced relation to said disc and said other contacts adapted to be engaged by portions of said plunger when said plunger is moved beyond said second position to a third position relative to said disc whereby a circuit to said automatic means is closed for nullifying the effect of said automatic means on said relay.

8. In an electric switch having a plurality of stationary contacts arranged in a circular row and a rotatable contact adapted to selectively engage certain of said spaced contacts, a means for rotatably actuating said rotatable contact, comprising; a rotatable disc operatively connected with said rotatable contact having a plurality of staggered spaced ratchet elements radially arranged on said disc and a reciprocatory plunger having at least two staggered projections thereon, one of said projections being adapted to engage all of said elements and the other being adapted to engage only alternate projections when said plunger is moved relative to said disc.

9. In an electric switch having; a plurality of stationary contacts arranged in a circular row, a rotatable contact adapted to selectively engage certain of said stationary contacts, and means for actuating said rotatable contact, said means including; a rotatable disc operatively connected with said rotatable contact having a plurality of staggered radially spaced ratchet openings arranged in a circular row on said disc, and a reciprocating plunger provided with two staggered spaced projections, one of said projections being adapted to engage all of said ratchet openings for rotatively moving said disc a predetermined portion of a revolution when said plunger is axially moved a predetermined distance relative to said disc and other of said lugs being adapted to engage only alternate ratchet openings and thereby move said disc an additional portion of a revolution when said plunger is moved beyond said first position to a second predetermined position.

10. In an electric switch having a plurality of stationary contacts arranged in a circular row and a rotatable contact adapted to selectively engage certain of said spaced contacts, means for actuating said rotatable contact, comprising; a rotatable disc operatively connected with said rotatable contact and having a plurality of staggered ratchet openings alternately arranged and radially spaced in a circular row on said disc and a reciprocal plunger having two spaced staggered projections thereon, one of said projections being adapted to engage all of said ratchet openings for rotatively moving said disc one-sixth of a revolution when said plunger is axially moved a predetermined position relative to said disc and the other of said lugs being adapted to engage only alternate ratchet openings and thereby alternately moving said disc an additional one-sixth revolution when said plunger is moved beyond said first position to a second predetermined position relative to said disc, and a stationary contact in spaced relation to said disc and said other contacts adapted to be engaged by a portion of said plunger when said plunger is moved beyond said second position to a third position relative to said disc.

References Cited in the file of this patent

UNITED STATES PATENTS

| | | |
|---|---|---|
| 2,423,278 | Willis | July 1, 1947 |
| 2,496,118 | Brown | Jan. 31, 1950 |